J. NITZGEN.
MOLDING APPARATUS.
APPLICATION FILED JUNE 15, 1917.

1,328,887.

Patented Jan. 27, 1920.
6 SHEETS—SHEET 2.

Inventor
Joseph Nitzgen.
By his Attorney
Oscar Geier

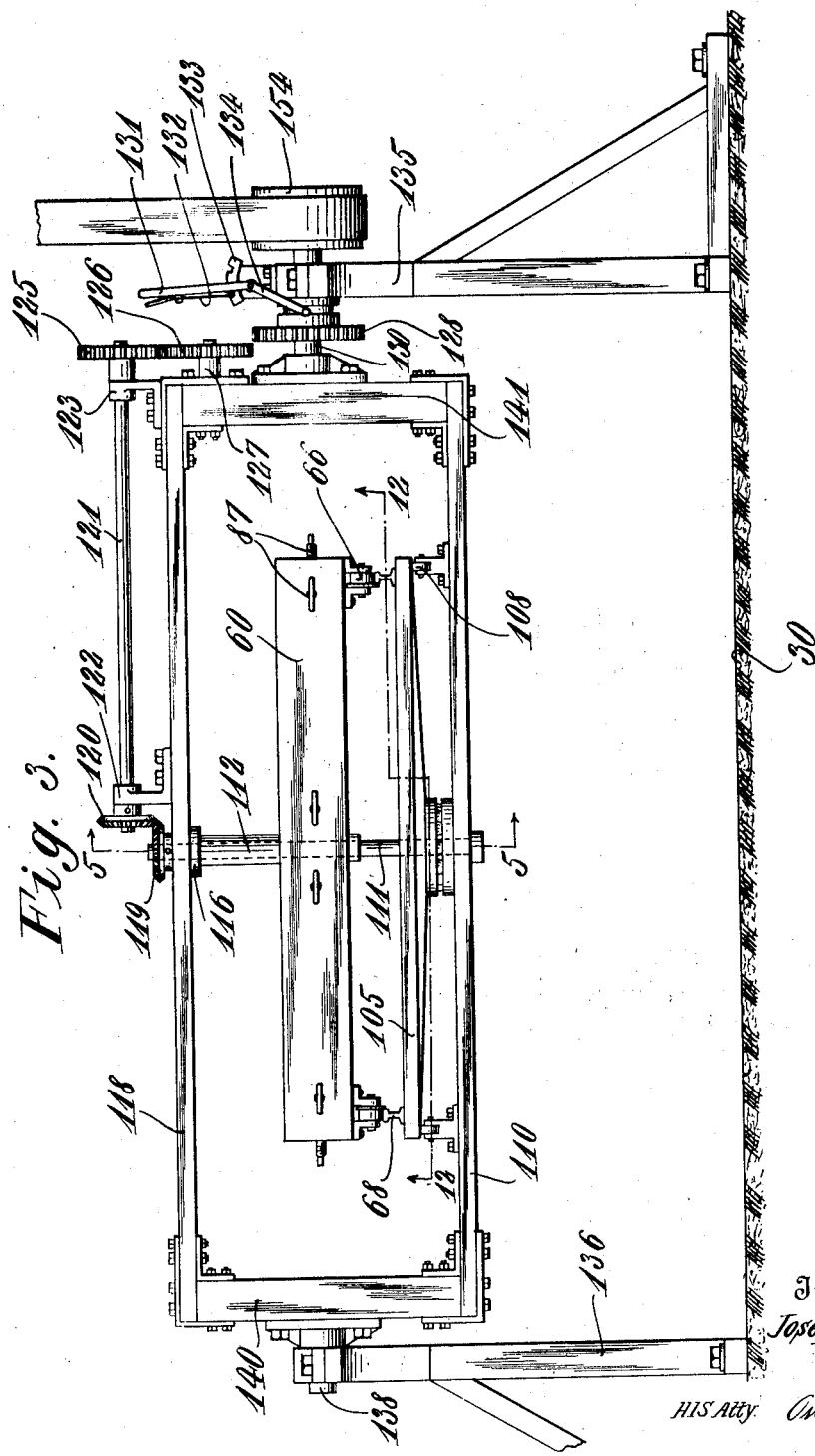

J. NITZGEN.
MOLDING APPARATUS.
APPLICATION FILED JUNE 15, 1917.
1,328,887.
Patented Jan. 27, 1920.
6 SHEETS—SHEET 4.
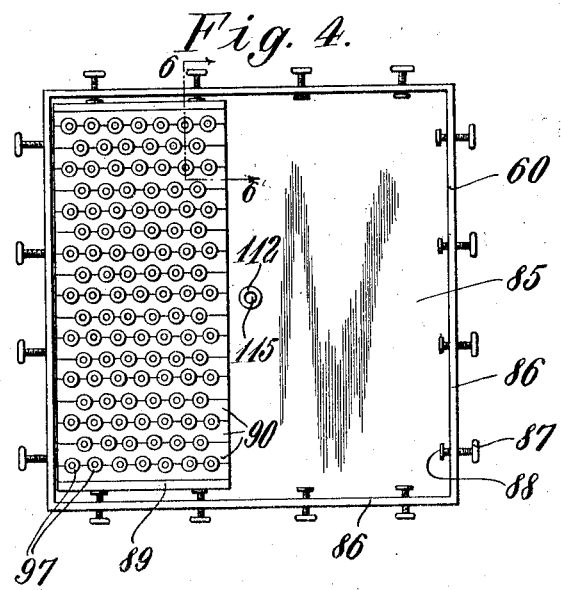
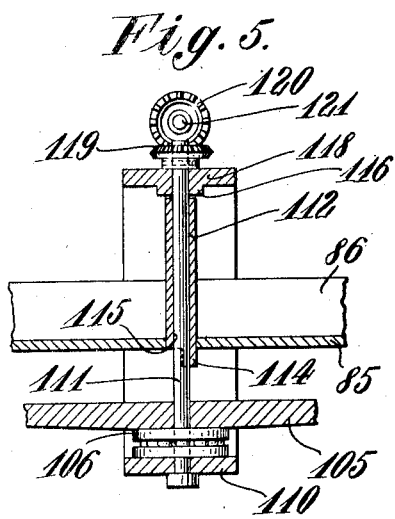
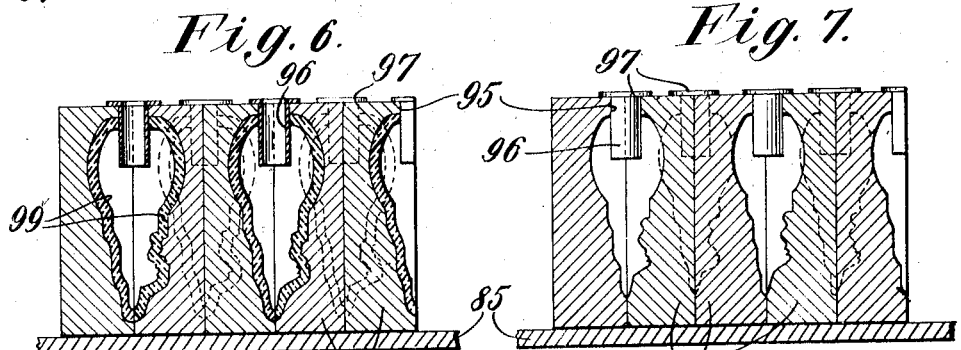
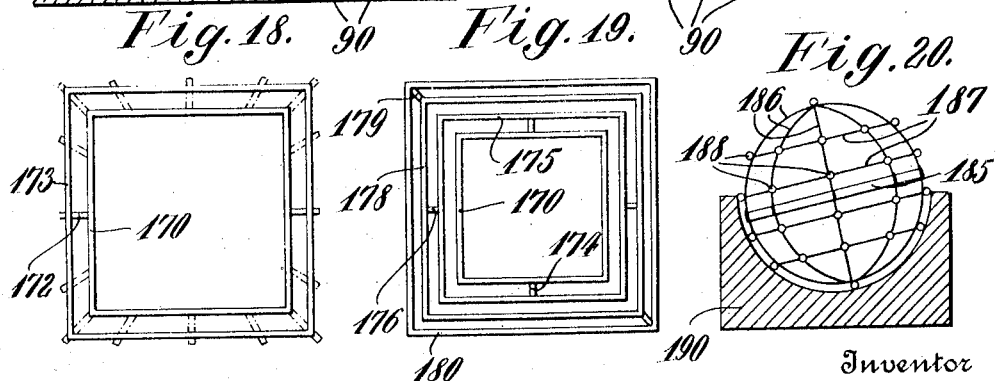
Inventor
Joseph Nitzgen
By his Attorney
Oscar Geier J. NITZGEN.
MOLDING APPARATUS.
APPLICATION FILED JUNE 15, 1917.
1,328,887.
Patented Jan. 27, 1920.
6 SHEETS—SHEET 5.
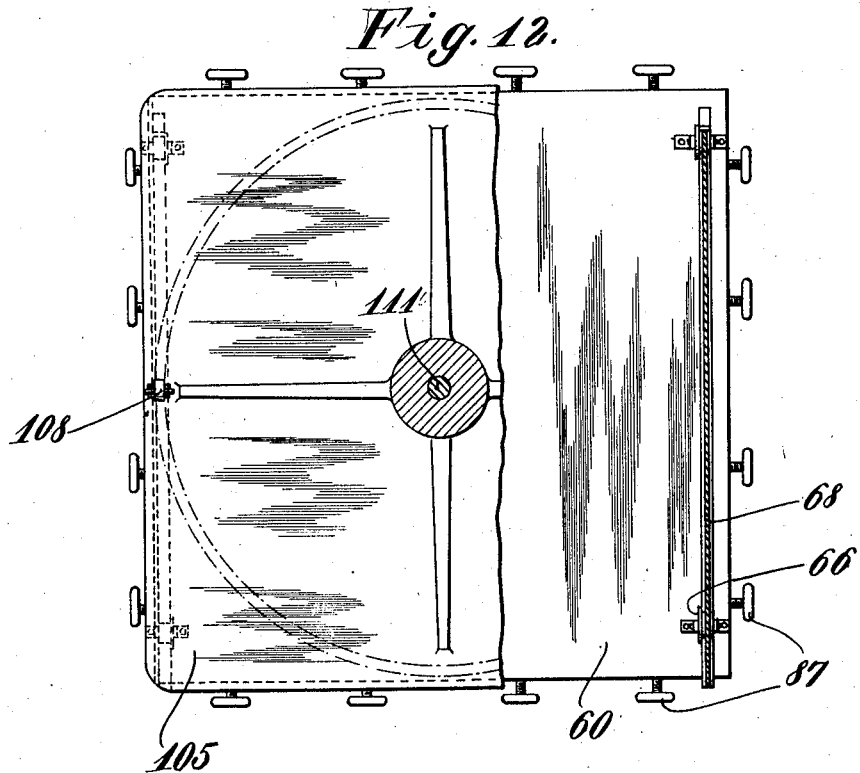
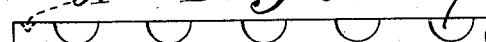
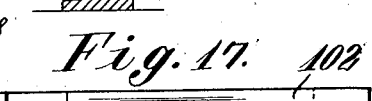
Inventor
Joseph Nitzgen.
By his Attorney
Oscar Geier

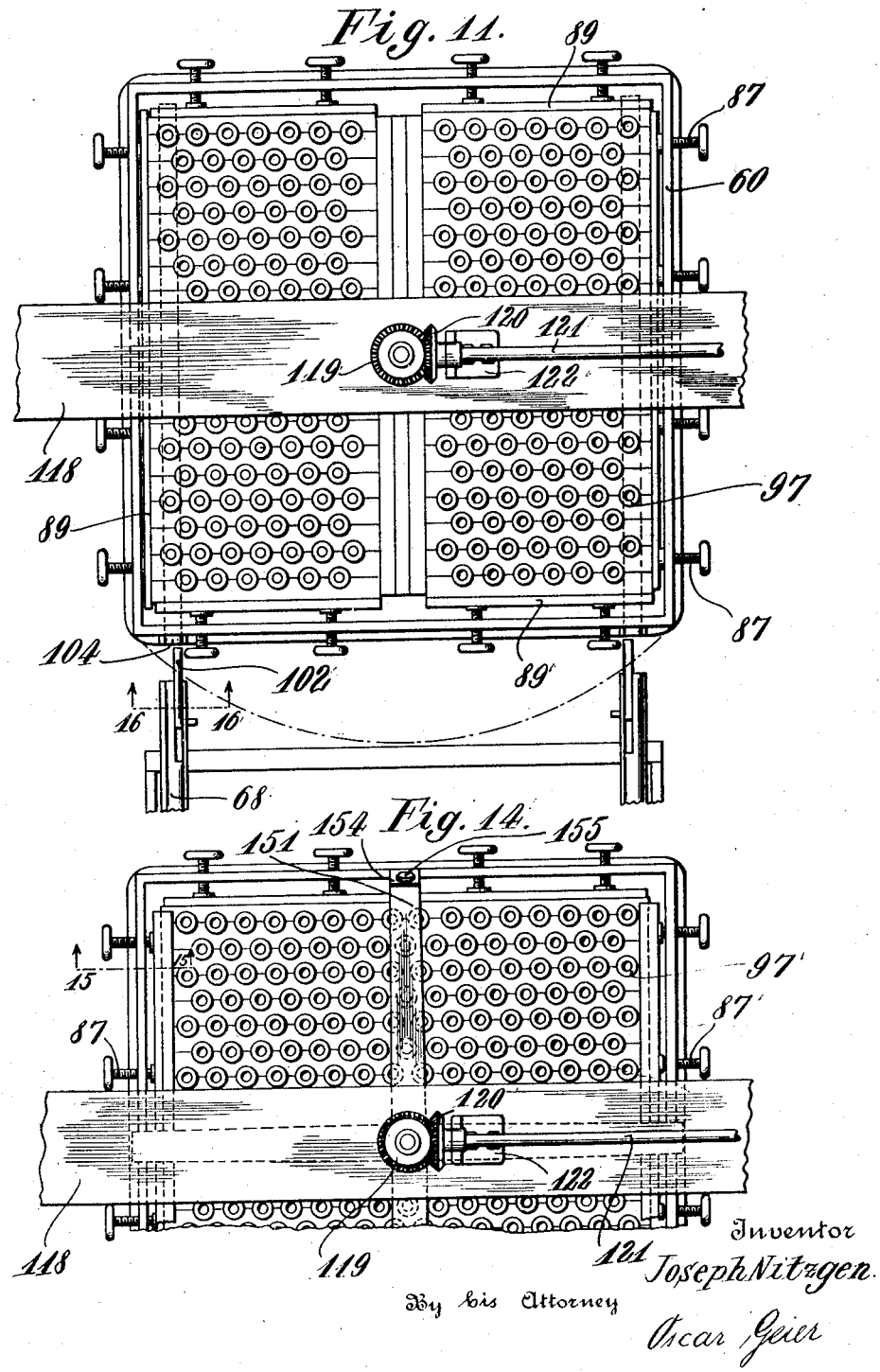

UNITED STATES PATENT OFFICE.

JOSEPH NITZGEN, OF NEW YORK, N. Y.

MOLDING APPARATUS.

1,328,887.    Specification of Letters Patent.    Patented Jan. 27, 1920.

Application filed June 15, 1917. Serial No. 174,853.

*To all whom it may concern:*

Be it known that I, JOSEPH NITZGEN, a subject of the Emperor of Germany, resident of New York, county of New York, and State of New York, have invented certain new and useful Improvements in Molding Apparatus, of which the following is a specification.

This invention relates to improvements in mechanisms for molding hollow articles from plastic material.

The principal object of the invention is to provide means whereby a plurality of articles either like or unlike, may be simultaneously molded, the molds being so manipulated as to produce the articles with hollow interiors, true in outline or profile to the sinuosities of the mold, the articles being produced with substantially no waste, and with a minimum of manual labor.

A further object is to provide molds comprised of a flexible substance or rigid molds of plaster or other solid material, so that the articles may be readily removed therefrom irrespective of irregular, outstanding projections which may be angularly formed or larger at their extremities than where joined to the main body.

A still further object is to provide a machine having compartments, one of which is used as a receptacle for the ingredients of the article to be molded, a measuring compartment, a mixing chamber in which the ingredients and fluids are entered from their respective reservoirs, and delivered from the mixing chamber to a plurality of sectional molds, and then transferred to another portion of the machine where the molds, contained in suitable flasks, are rotated, reversed and so maneuvered that the plastic or semi-fluid contents are equally distributed over the entire interior of the molds, the residue being so conserved that no waste is permitted.

The invention comprises not only the construction of flexible molds, but rigid molds made of solid material, and a machine in which they are transferred for manipulation, but the process as well of operating upon a plurality of different objects at the same time.

These and other like objects are attained by the novel process, combination and construction described in this specification and shown in the accompanying drawings, forming a material part thereof, and in which:

Fig. 3 is a front elevational view of the mold handling apparatus.

Fig. 4 is a top plan view showing a mold holder made in accordance with the invention.

Fig. 5 is a vertical sectional view taken on line 5—5 of Fig. 3.

Fig. 6 is a fragmental sectional view taken on line 6—6 of Fig. 4.

Fig. 7 is a similar sectional view to that shown in Fig. 6, but showing an unlined mold.

Figs. 8, 9 and 10 are fragmental top plan views of the mold elements employed.

Fig. 11 is an enlarged fragmental plan view of the agitator showing a charged mold holder engaged therein.

Fig. 12 is a bottom plan and sectional view of the same, taken on line 12—12 of Fig. 3.

Fig. 13 is a side elevational view showing a modified form of mold holder engaging means.

Fig. 14 is a partial top plan view of the same.

Fig. 15 is a fragmental sectional view taken on line 15—15 of Fig. 14.

Fig. 16 is a similar sectional view taken on line 16—16 of Fig. 11.

Fig. 17 is a side elevational view of the rail extension as indicated in Fig. 16.

Fig. 18 is a top plan view, diagrammatic in character, indicating a modification of mold holding means.

Fig. 19 is a similar view to that of Fig. 18 but showing another modification, and Fig. 20 is a diagrammatic view showing a spherical mold holding device.

Figure 1:
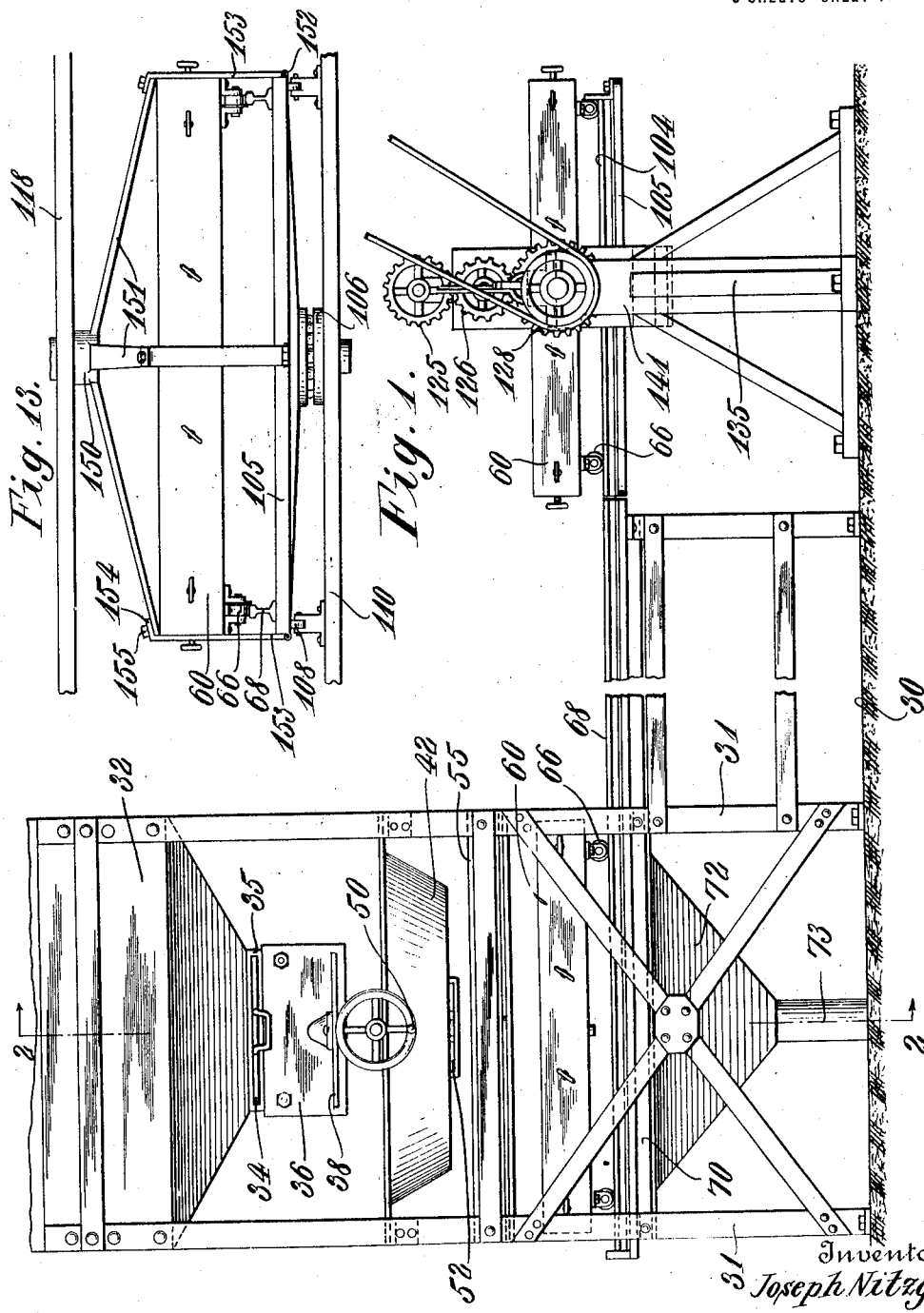
Figure 1 is a side elevational view of an apparatus made in accordance with the invention.
Figure 2:
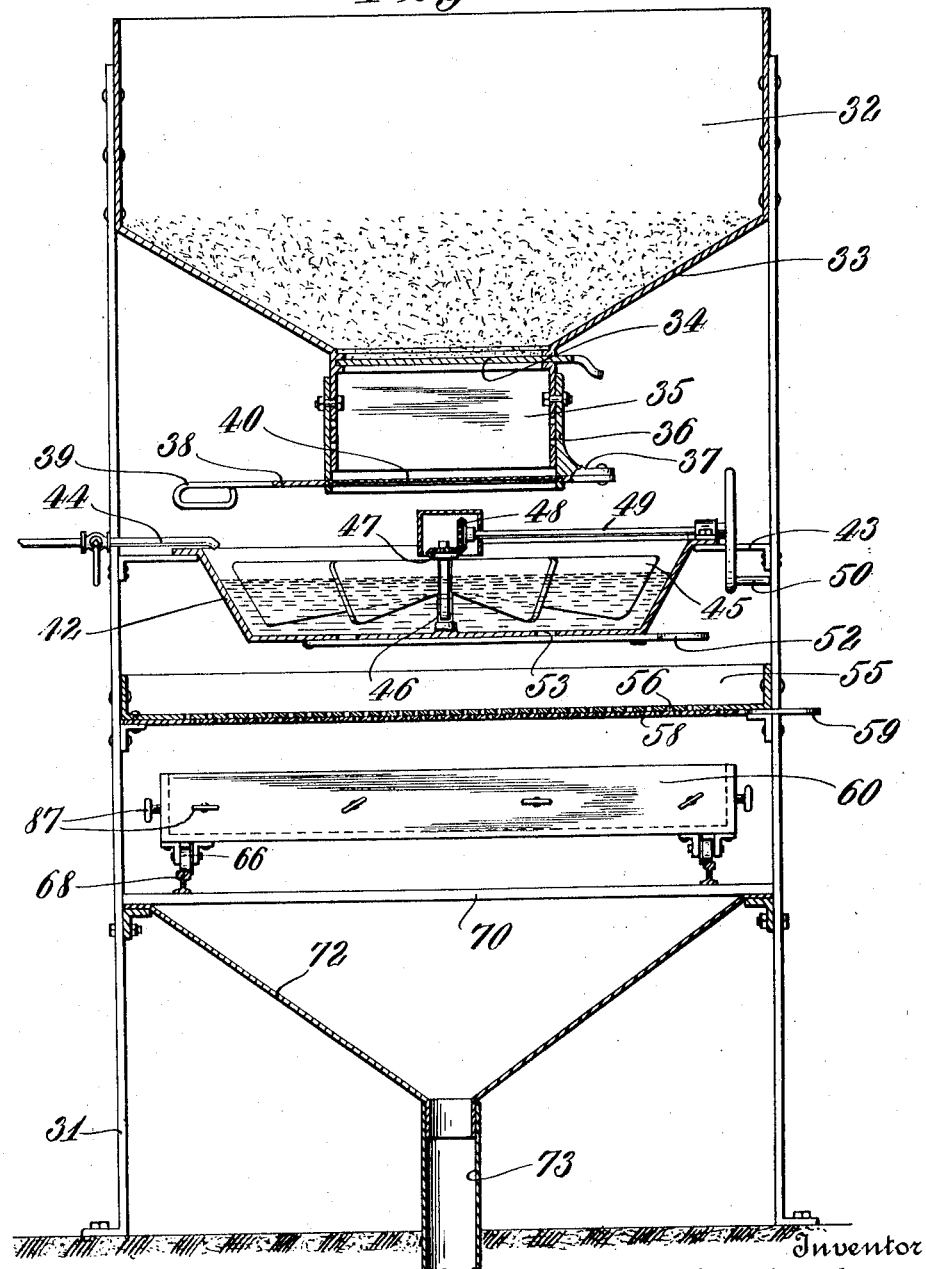
Fig. 2 is a vertical sectional view taken on line 2—2 of Fig. 1.

The entire apparatus is composed of two main parts, which may be called respectively the filler and agitator, both resting upon a solid foundation 30, the parts being connected by a runway as shown.

Secured by suitable footings to the foundation are four columns 31, supporting at their upper end a bin or reservoir 32, adapted to contain the substance or material from which the molded articles are to be made, the flooring 33 of the bin being inclined to a rectangular central opening provided with a gate valve 34, adapted for hand operation and controlling the communicating passage with a chamber 35, capable of holding a sufficient quantity of material to make one full series of molds.

Surrounding the walls of the chamber 35 is a frame 36, at one side of which extends an arm 37, pivotally supporting a lever 38, having a handle 39 extending convenient of access, and by means of which the sieve 40 may be agitated, thereby sifting the contents of the chamber into the receptacle 42, secured by brackets 43, to the uprights 31.

Water from any convenient source, as the supply pipe 44 enters the receptacle 42, in which is rotatably mounted a plurality of beater blades 45, driven from a central shaft 46, to which rotary motion is communicated through the pair of bevel gears 47 and 48, the latter of which is rigidly attached to the shaft 49, driven by the handle 50, so that the contents of the vessel 42 may be stirred and intimately mixed, which is particularly desirable when mixing the water with the dry powders constituting the plastic material to be used in the molds.

When the ingredients have been mixed and it is desired to make use of the same, the lever 52 is operated, thereby opening the passages 53, formed in the bottom of the vessel 42, permitting the pasty mass to enter the open topped compartment 55, the same having a perforate floor 56, the openings through which are closed or opened by operating the plate 58 by means of the handle 59, thereby allowing such portion of the contents as is desired to drop upon the surface of the molds carried in the holder 60, supported by wheels 66, adapted to operate on the fixed rails 68, which are secured to the platform 70, the latter extending between and being secured to the uprights 31, immediately above the open part of the refuse funnel 72, terminating in a pipe 73, whereby any excess or waste material may be conducted to a storage point.

The mold holders 60 are of very simple construction, comprised of a base plate 85, having raised edges 86 upon each of its sides, in which are engaged screws 87 having loosely connected disks 88 on their points, adapted to contact with the strips or blocks 89 held within the enframing casing or holder.

The molds themselves, as can best be seen in Figs. 6 to 10 inclusive, are elongated blocks 90, substantially rectangular in cross-section, having their faces alined by means of integrally formed projections 93 and coresponding cavities 94, and contain a plurality of registering openings 95, formed equally in each, adapted to receive tubular metallic bushings 96, formed with extending flanged heads 97, limiting their inward movement.

The blocks constituting the mold are comprised of a glutinous material, extremely pliable and elastic, and are made substantially as follows:—

A plurality of patterns are embedded at uniform intervals in a holder, which may be of plaster Paris or the like, so that one-half of their bulk extends above the otherwise level surface in which they are embedded, the surface of the pattern being brushed with grease, and a wall built up surrounding the patterns, the walls inclosing a chamber in which the material forming the mold is afterward poured and allowed to set, the other mating mold being made in a similar manner, and it will be seen that the openings on the adjacent side of two mold blocks are exactly opposite and uniform, while the molds on the opposite side of each of the mold blocks are alternated or staggered therebetween, so as to use the mold material economically.

The molds which constitute the series are placed in the mold holder or frame 60, the extending elements 93, entered in the corresponding cavities 94, and the mold holder filled with the molds, as shown in Fig. 4, the same being pressed toward each other by the strips 89, the tubular bushings 96 being inserted in the semi-circular openings formed in the top and through which the semi-fluid material to form the objects is poured.

In place of using molds made entirely of a pliable composition, particularly on larger objects, the molds may be made rigid and contain a flexible lining 99, as shown particularly in Fig. 6, but in any case, the interior of the mold, in which the entered material may make contact, is of a pliable nature, so that undercut projections, sinuous shape and the like, may be readily removed without injury to the mold as would be the case if the molds were rigid and made of a solid, unyielding substance.

The molds having been placed in the holder 60, as shown in Figs. 4, 11, and 14, and the material to be molded having been distributed into the molds as hereinbefore described, the holder and the molds contained therein are then moved to the mill 200 along the rails 68, said rails terminating in a movable section 102, which registers with a second set of rails 104 supported upon a platform 105, forming part of the mill 200, said platform resting in a foot-bearing 106 at the center and a pair of oppositely disposed rollers 108 at the sides, both bearing and rollers being carried by the bar 110, through which passes a central shaft 111, engageable with a sleeve 112, having a projecting portion 114, by means of which the shaft 111 may be caused to enter the opening 115, through the sleeve which passes centrally through the plate 85 of the mold holder 60, the upper end of the shaft being guided in bearings 116.

It is to be understood that the shaft 111 is manually inserted into the sleeve 112, passed through the bearing 118 and hub of the bevel gear 119 each time the holder 60 is introduced into the mill, the hub being keyed to the shaft after it has been inserted.

The bevel gear 119, meshes with a mating gear 120, fixed on the horizontal shaft 121, supported in bearings 122 and 123, the latter being at its outer end and immediately beyond which is affixed a spur pinion 125, in mesh with an idle gear 126, mounted on the bracket 127, and engageable by a spur gear 128, slidably mounted on a shaft 130 and controlled by a clutch mechanism comprised of a yoke 134, and an operating lever 131, the same having a detent 132 engaging with openings formed in the segment 133, immediately above one of the main standards 135, secured to the foundation 30.

A similar standard 136 at the opposite end supports a stub shaft 138, rigidly attached to a frame bar 140, a similar bar 141 being likewise engaged with the shaft 130, these bars constituting the end elements of a frame having longitudinally disposed bars 110 and 118, firmly secured at the ends by bracket elements as indicated, it being understood that the frame is rotatable within bearings at the upper ends of the standards 135 and 136, as is also the mold held centrally thereon by means of the tube 112 and shaft 111.

Figs. 13 and 14 show a modified form of mold holder engaging means, in which a hub 150 extends downward through the bar 118, and has rigidly engaged at its top the miter gear 119, there being rigidly engaged with the hub four radial arms 151, the angularly disposed ends of which terminate above the mold holder 60 when placed in position.

Engaged with the platform 105, upon each of its four sides by hinges 152, are strips 153, the upper end 154 of which is turned inwardly at the same angle as the arms 151 with which they may be rigidly engaged by the bolts 155, the strip 153 making contact with the outer side of the mold holder 60 and holding it centrally upon the platform, thereby dispensing with the entering of the shaft through the mold and obviously increasing its capacity.

In operation, the molds having been made in the manner indicated, of flexible material, they are placed in the holder, clamped securely, and positioned under the filler, where the mixed material from the pan 42 is entered in sufficient quantities to partially fill the space within their interior.

While this composition is in a semi-fluid condition, the mold holder is caused to travel along the rails 68, to the platform 105 and there held in position either by the shaft 111, or the device shown in Figs. 14 and 13, whereupon power is communicated through the belt pulley 154, causing the frame to rotate on its longitudinal axis, and as the frame is rotated, the mold holder is caused to rotate upon its central axis by the gears when the lever 131 is operated.

Thus the mold holder, containing a plurality of molds, is given a combination of movements, causing the semi-fluid material to reach to the innermost part of the molds, and as the same rapidly sets, produces a substantially even, uniform thickness therewithin, the contents being prevented from flowing out when the molds are reversed by means of the inserted bushings 96.

Thus a relatively small quantity of fluid material may be used in an economical manner, as it will be seen that the same is caused to enter the innermost interstices of the mold.

After the substance is set, forming the articles desired, the screws 87 are slackened, permitting the molds to be withdrawn and separated, whereby the molded articles may be removed, air dried or baked as preferred in further operations, and permitting the molds to be used indefinitely, it being only necessary to cleanse the same of any adhering particles and give the interior a coating of grease or the like prior to subsequent use.

Fig. 18 shows a diagrammatic representation in which the mold holder 170 is pivoted on pins 172, the same being rotatably engaged with a rigid frame 173, in such manner that the pins can be withdrawn from the positions indicated in full lines and entered into any of those shown by broken lines.

In Fig. 19, a somewhat similar device is shown, in which the mold holder 170 is held by oppositely disposed pins 174, the frame 175 being sustained by pins 176, set in the frame 178, carried in turn by pins 179 and ultimately supported in the outer frame 180.

In Fig. 20, the mold holder 185 is circular and held by a plurality of circular rings or bands 186, to which are engaged transversely disposed rings 187, at the junction of which are attached small spherical elements 188, suited to act as anti-frictional bearings and permitting the device as a whole to be rotated in any desired direction within the holder 190.

From the foregoing, it will be observed that, in addition to the use of a plastic mold in which rigid articles of irregular outline may be molded, a mechanism has been described by means of which the partially filled molds are caused to rapidly gyrate upon a multiplicity of axes, so that the mold contents is thoroughly dispensed and disposed uniformly therein.

Having thus described my invention, what I claim as new and desire to secure by Letters Patent, is:—

1. In a molding apparatus, a stationary track, a rotatable frame supported adjacent one end of the stationary track, a rotatable platform supported within the frame, molds adapted to be moved along the track and on to the rotatable platform, means for rotating the platform in one plane, means for rotating the frame in a plane opposite to the plane in which the platform is rotated, and means for delivering material to the mold.

2. In a molding apparatus, a stationary track, a rotatable frame adjacent one end of the track, a rotatable platform supported by the frame, molds adapted to be moved along the track and on to the rotatable platform, means for rotating the frame in a horizontal plane, and means adapted to be clutched with the first mentioned means for moving the platform in a plane opposite to the plane in which the frame is rotated, and means for delivering material to the molds.

3. In a molding apparatus, a stationary track, a rotatable frame positioned at one end of the track, a circular platform supported within the frame, and carrying a track section, a mold adapted to be moved on to the track section of the circular platform, roller means on the frame and engaging the lower surface of the circular platform for permitting rotation thereof, means for rotating the frame, means including shafts and gears for rotating the circular platform in a plane opposite to the plane of rotation of the frame, one of said shafts extending through the frame and mold for supporting the mold against lateral movement, and means for delivering material to the mold.

In testimony whereof I have affixed my signature.

JOSEPH NITZGEN.